United States Patent
Afshari

(10) Patent No.: US 10,767,316 B2
(45) Date of Patent: Sep. 8, 2020

(54) PAPER COMPRISING ARAMID PULP AND A FRICTION PAPER MADE THEREFROM

(71) Applicant: E I DU PONT DE NEMOURS AND COMPANY, Wilmington, DE (US)

(72) Inventor: Mehdi Afshari, Midlothian, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 135 days.

(21) Appl. No.: 16/166,296

(22) Filed: Oct. 22, 2018

(65) Prior Publication Data

US 2019/0127918 A1 May 2, 2019

Related U.S. Application Data

(60) Provisional application No. 62/580,009, filed on Nov. 1, 2017.

(51) Int. Cl.

| | |
|---|---|
| D21H 17/34 | (2006.01) |
| D21H 27/00 | (2006.01) |
| D21H 13/26 | (2006.01) |
| D21H 15/10 | (2006.01) |
| D21H 19/12 | (2006.01) |
| D21H 23/04 | (2006.01) |
| D21H 17/67 | (2006.01) |
| D21H 23/66 | (2006.01) |
| D21H 19/84 | (2006.01) |
| D21H 21/14 | (2006.01) |
| D21H 17/68 | (2006.01) |
| D21H 19/24 | (2006.01) |
| F16D 69/02 | (2006.01) |

(52) U.S. Cl.
CPC ............. *D21H 27/00* (2013.01); *D21H 13/26* (2013.01); *D21H 15/10* (2013.01); *D21H 17/34* (2013.01); *D21H 17/67* (2013.01); *D21H 17/675* (2013.01); *D21H 17/68* (2013.01); *D21H 19/12* (2013.01); *D21H 19/24* (2013.01); *D21H 19/84* (2013.01); *D21H 21/14* (2013.01); *D21H 23/04* (2013.01); *D21H 23/66* (2013.01); *F16D 69/026* (2013.01); *F16D 2200/0095* (2013.01)

(58) Field of Classification Search
USPC .......................................................... 162/135
See application file for complete search history.

(56) References Cited

U.S. PATENT DOCUMENTS

| | | |
|---|---|---|
| 3,036,950 A | 5/1962 | Martin |
| 5,202,184 A | 4/1993 | Brierre et al. |
| 5,474,842 A | 12/1995 | Hoiness |
| 5,532,059 A | 7/1996 | Lee |
| 6,001,750 A | 12/1999 | Lam |
| 6,139,688 A | 10/2000 | Ramachandran |

FOREIGN PATENT DOCUMENTS

| | | |
|---|---|---|
| WO | 96/10105 A1 | 4/1996 |
| WO | 2007/075575 A2 | 7/2007 |
| WO | 2018/037015 A1 | 3/2018 |

OTHER PUBLICATIONS

International Search Report dated Feb. 4, 2019, for corresponding International Application No. PCT/US18/057997, filed on Oct. 29, 2018.

*Primary Examiner* — Mark Halpern

(57) ABSTRACT

A paper comprises from 60 to 99 weight percent of a aramid fibrous pulp and from 1 to 40 weight percent of a polyvinylpyrrolidone coating on the fiber surface, the coating being neither chemically nor electrostatically bound to the fibers. A friction paper composite comprising the paper and a resin coating is also described.

15 Claims, No Drawings

PAPER COMPRISING ARAMID PULP AND A FRICTION PAPER MADE THEREFROM

BACKGROUND

This invention pertains to a base paper comprising aramid pulp and polyvinylpyrrolidone. The paper, when coated with resin, is useful as a friction material.

U.S. Pat. No. 5,532,059 to Lee discloses a fibrous pulp of a combination of poly(p-phenylene terephthalamide) and poly(vinyl pyrrolidone) along with a process for making it. The process involves conducting a poly(p-phenylene terephthalamide polymerization reaction in the presence of poly(vinyl pyrrolidone) and the product is an improved pulp with increased fibrils and no fiber stalks.

U.S. Pat. No. 3,036,950 to Martin describes a process for depositing a water-dispersible resin on beaten cellulose pulp fibers comprising first dispersing polyvinylpyrrolidone into an aqueous slurry of said fibers, and subsequently dispersing said resin into said slurry, the polyvinylpyrrolidone being added in an amount of at least about 0.05% by weight based on the dry weight of said pulp fibers.

U.S. Pat. No. 6,139,688 to Ramachandran teaches a coated aramid fiber wherein the coating is a small amount of chitosan and the coated fiber is useful in manufacture of an improved friction paper.

There is an ongoing need to provide a paper for friction applications wherein the tensile strength of the paper can be increased with no or minimal increase in paper porosity.

SUMMARY OF THE INVENTION

This invention pertains to a paper comprising from 60 to 99 weight percent of a aramid fibrous pulp, said fibrous pulp comprising fibers, and from 1 to 40 weight percent of polyvinylpyrrolidone present as a coating on the surface of the fibers, the coating being neither chemically nor electrostatically bound to the fibers.

The invention further pertains to a friction material composite made from the paper.

DETAILED DESCRIPTION

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading or in any portion of the disclosure may be combined with embodiments illustrated under the same or any other heading or other portion of the disclosure.

Any combination of the elements described herein in all possible variations thereof is encompassed by the invention unless otherwise indicated herein or otherwise clearly contradicted by context.

Definitions

As used herein, the term "paper" is employed in its normal meaning and refers to a nonwoven sheet prepared using conventional wet-lay papermaking processes and equipment. In the context of this disclosure, a paper is also referred to as a "base paper".

A "friction paper" as described herein is a composite comprising the base paper as described above and a resin coating.

By "pulp" is meant particles of aramid material having a stalk and fibrils extending therefrom wherein the stalk is generally columnar and about 10 to 50 microns in diameter and the fibrils are hair-like members only a fraction of a micron or a few microns in diameter attached to the stalk and about 10 to 100 microns long. In paper manufacture, the fibrils on pulp are important to act as hooks or fasteners to hold adjacent particles in the paper and provide integrity to the paper construction. The surface area of pulp used herein is 0.5 to 20 square meters per gram. Aramid pulp may be made, for example, by refining aramid floc or as described in U.S. Pat. No. 5,202,184.

Floc comprises generally short fibers made by cutting continuous filament fibers into short lengths without significant fibrillation. Although the lengths of the short fibers can be of almost any length, an example of a suitable range is from 1 mm to 12 mm for a reinforcing fiber and from 5 mm to 800 mm for a staple fiber that is spun into a yarn. Typically, floc has a surface area of about 0.08 to 0.6 square meters per gram. Short fibers suitable for use in the present invention are the reinforcing fibers disclosed in U.S. Pat. No. 5,474,842 to Hoiness.

The term "fibrids" as used herein, means a very finely-divided polymer product of small, filmy, essentially two-dimensional, particles having a length and width of about 100 to 1000 micrometers and a thickness of about 0.1 to 1 micrometer.

In the context of this application the term aramid includes a polymer wherein at least 85% of the amide (—CONH—) linkages are attached directly to two aromatic rings. Additives can be used with the aramid; and it has been found that up to as much as 10 percent by weight of other polymeric material can be blended with the aramid, or that copolymers can be used having as much as 10 percent of other diamine substituted for the diamine of the aramid, or as much as 10 percent of other diacid chloride substituted for the diacid chloride of the aramid. Para-aramids are exemplary polymers in fibers of this invention and poly(p-phenylene terephthalamide) (PPD-T) is the preferred para-aramid. Another suitable aramid type fiber is one based on aromatic copolyamide such as is prepared by reaction of terephthaloyl chloride (TPA) with a combination mixture (for example, a 50/50 mole ratio) of p-phenylene diamine (PPD) and 3, 4'-diaminodiphenyl ether (DPE). Yet another suitable fiber is that formed by polycondensation reaction of two diamines, p-phenylene diamine and 5-am ino-2-(p-aminophenyl) benzimidazole with terephthalic acid or anhydrides or acid chloride derivatives thereof, or isomers of the foregoing. Another fiber type is an aromatic copolymer derived from the copolymerization of para-phenylenediamine, 5(6)-amino-2-(p-aminophenyl)benzimidazole and terephthaloyl dichloride.

Paper

In the context of this disclosure, a paper is also referred to as a base paper.

In one embodiment, the paper comprises from 60 to 99 weight percent of aramid fiber pulp, such as p-aramid fiber pulp, said pulp comprising fibers, and from 1 to 40 weight percent of a polyvinylpyrrolidone (PVP) coating on the surface of the fibers, the coating being neither chemically nor electrostatically bound to the fibers.

In another embodiment, the paper comprises from 80 to 98 weight percent of aramid fiber pulp, such as p-aramid fiber pulp, and from 2 to 20 weight percent of a polyvinylpyrrolidone (PVP) coating.

In another embodiment, the paper comprises from 80 to 95 weight percent of aramid fiber pulp, such as p-aramid fiber pulp, and from 5 to 20 weight percent of a polyvinylpyrrolidone (PVP) coating.

In a further embodiment, the paper comprises from 80 to 90 weight percent of aramid fiber pulp, such as p-aramid fiber pulp, and from 10 to 20 weight percent of a polyvinylpyrrolidone (PVP) coating.

In yet another embodiment, the paper further comprises from 1 to 30 weight percent of aramid floc, such as p-aramid floc. Alternatively, the paper further comprises from 1 to 20 weight percent of aramid floc, such as p-aramid floc, or from 1 to 10 weight percent of aramid floc, such as p-aramid floc.

Paper can also be made using a combination of aramid floc and aramid fibrids wherein the fibrids serve to hold together the floc and other paper components.

The paper may further comprise components such as fillers or friction modifying particles. Exemplary fillers include silica, diatomaceous earth, graphite and alumina. Exemplary friction modifying particles include metal oxides, nitrides, carbides and mixtures thereof. The friction modifying particles may have at least one dimension of less than 1 micrometer.

One method of applying the PVP to the aramid pulp is by adding the PVP to an aqueous slurry of the pulp and other fibrous materials, forming a paper and drying the paper. However, other methods may also be used.

The paper may be made on any suitable paper making machine using techniques well known in the art.

Preferably, the paper has a ratio of tensile strength to average Gurley air permeability 300 cc value of at least 4.0 MPa/s, or of at least 4.3 MPa/s.

Friction Paper

A friction paper as described herein is a composite comprising the base paper as described above and a resin coating.

In one embodiment, the friction paper comprises from 40 to 95 weight percent of a base paper and from 5 to 60 weight percent of a resin.

In another embodiment, the friction paper comprises from 60 to 90 weight percent of a base paper and from 10 to 40 weight percent of a resin.

Friction Paper Resin

The resin component of the friction paper may be phenolic, a modified phenolic resin, silicone, polyimide or combinations thereof.

Silicone resins useful in the present invention include, for example, thermal curing silicone sealants and silicone rubbers. Another useful resin is an epoxy modified phenolic resin which contains about 5 to about 25 percent, by weight, and preferably about 10 to about 15 percent, by weight, of an epoxy compound with the remainder (excluding solvents and other processing aids) being phenolic resin.

The resin is impregnated onto and into the base paper, and then cured by heat and pressure to form the final shape of the friction paper, as known in the art.

Conventional techniques such as immersion coating and surface coating may be used to impregnate the paper.

INDUSTRIAL APPLICABILITY

The present invention is useful as a high energy friction material for use with clutch plates, transmission bands, brake shoes, synchronizer rings, friction disks or system plates.

Some embodiments disclosed herein are set forth in the following clauses, and any combination of these clauses (or portions thereof) may be made to define an embodiment. For example, if a composition described in an embodiment may vary according to an additional feature or claim element, it is to be understood that other compositions described in other embodiments may also vary according to that same additional feature or claim element. For example, Clause 1a discloses an embodiment wherein the aramid fiber pulp in the paper of clause 1 is a p-aramid fiber pulp; similarly, for any other embodiment disclosing a paper or a composite comprising (or consisting of, or consisting essentially of) an aramid fiber pulp, there exists another embodiment wherein the paper or composite comprises (or consists of, or consists essentially of) a p-aramid fiber pulp. Generally, for any embodiment described herein for which a composition (such as a paper or a composite) comprises, or consists of, or consists essentially of an aramid fibrous pulp or an aramid floc or an aramid fibrid, there exists another corresponding embodiment which comprises, or consists of, or consists essentially of a p-aramid fibrous pulp or a p-aramid floc or a p-aramid fibrid. Furthermore, methods described herein that utilize a composition may also vary by way of such compositional variations.

Clause 1: A paper comprising from 60 to 99 weight percent based on the total weight of the paper of aramid fibrous pulp, said fibrous pulp comprising fibers, and from 1 to 40 weight percent based on the total weight of the paper of polyvinylpyrrolidone present as a coating on the surface of the fibers, the coating being neither chemically nor electrostatically bound to the fibers.

Clause 1a: In an embodiment, the aramid fibrous pulp in the paper of clause 1 is a p-aramid fibrous pulp.

Clause 2: The paper of clause 1 or 1a comprising from 80 to 99 weight percent of aramid fibrous pulp or p-aramid fibrous pulp and from 1 to 20 weight percent of polyvinylpyrrolidone. In an embodiment, the paper of clause 1 or 1a comprises from 80 to 98 weight percent of aramid fibrous pulp or p-aramid fibrous pulp and from 2 to 20 weight percent of polyvinylpyrrolidone.

Clause 3: The paper of clause 1 or 1a comprising from 80 to 95 weight percent of aramid fibrous pulp or p-aramid fibrous pulp and from 5 to 20 weight percent of polyvinylpyrrolidone.

Clause 4: The paper of clause 1 or 1a comprising from 80 to 90 weight percent of aramid fibrous pulp or p-aramid fibrous pulp and from 10 to 20 weight percent of polyvinylpyrrolidone.

Clause 4a: In an embodiment, there is provided a paper comprising aramid fibrous pulp or p-aramid fibrous pulp, said fibrous pulp comprising fibers, and polyvinylpyrrolidone present as a coating on the surface of the fibers, the coating being neither chemically nor electrostatically bound to the fibers; wherein the weight ratio of aramid fibrous pulp or p-aramid fibrous pulp to polyvinylpyrrolidone is from 60:40 to 99:1; or is from 80:20 to 99:1; or is from 80:20 to 98:2; or is from 80:20 to 95:5; or is from 80:20 to 90:10.

Clause 5: The paper of any of the preceding clauses having a ratio of tensile strength to average Gurley air permeability 300 cc value of at least 4.0 MPa/s. In an embodiment, the ratio of tensile strength to average Gurley air permeability 300 cc value is at least 4.3 MPa/s.

Clause 6: The paper of clause 1 consisting of, or consisting essentially of, from 60 to 99 weight percent of aramid fibrous pulp and from 1 to 40 weight percent of polyvinylpyrrolidone.

Clause 6a: The paper of clause 1 consisting of, or consisting essentially of, from 80 to 98 weight percent of aramid fibrous pulp and from 2 to 20 weight percent of polyvinylpyrrolidone.

Clause 6b: The paper of clause 1 consisting of, or consisting essentially of, from 80 to 95 weight percent of aramid fibrous pulp and from 5 to 20 weight percent of polyvinylpyrrolidone.

Clause 6c: The paper of clause 1 consisting of, or consisting essentially of, from 80 to 90 weight percent of p-aramid fibrous pulp and from 10 to 20 weight percent of polyvinylpyrrolidone.

Clause 7: The paper of clause 1 further comprising aramid floc, such as p-aramid floc, said floc comprising fibers, which floc is present in an amount of from 1 to 30 weight percent based on the total weight of the paper, wherein the polyvinylpyrrolidone is present as a coating on the surface of the aramid fibrous pulp fibers and the aramid floc fibers, and wherein the aramid fibrous pulp is no more than 98 weight percent based on the total weight of the paper. In an embodiment, the aramid fibrous pulp and the aramid floc are p-aramid fibrous pulp and p-aramid floc.

Clause 7a: The paper of clause 1 further comprising aramid floc, said floc comprising fibers, which floc is present in an amount of from 1 to 20, or 5 to 20 weight percent based on the total weight of the paper, wherein the polyvinylpyrrolidone is present as a coating on the surface of the aramid fibrous pulp fibers and the aramid floc fibers, and wherein the p-aramid fibrous pulp is no more than 98 weight percent based on the total weight of the paper. In an embodiment, the aramid fibrous pulp and the aramid floc are p-aramid fibrous pulp and p-aramid floc.

Clause 7b: In an embodiment, there is provided the paper of clause 4a further comprising aramid floc. In one such embodiment, the aramid floc is present in an amount of from 1 to 30, or 1 to 20, or 5 to 20, weight percent based on the total weight of the paper. In an embodiment, the aramid floc is p-aramid floc.

Clause 8: The paper of clause 1 further comprising a combination of aramid floc and aramid fibrids, said aramid floc and aramid fibrids comprising fibers, which combination of aramid floc and aramid fibrids is present in an amount of from 1 to 30, or 1 to 20, or 5 to 20 weight percent based on the total weight of the paper, wherein the polyvinylpyrrolidone is present as a coating on the surface of the aramid fibrous pulp fibers and the aramid floc fibers and the aramid fibrids, and wherein the aramid fibrous pulp is no more than 98 weight percent based on the total weight of the paper. In an embodiment, the aramid fibrous pulp and the aramid floc and the aramid fibrids are p-aramid fibrous pulp and p-aramid floc and p-aramid fibrids.

Clause 8a: In some embodiments, the paper of clause 4a further comprises a combination of aramid floc and aramid fibrids. In one such embodiment, the combination of aramid floc and aramid fibrids is present in an amount of from 1 to 30, or 1 to 20, or 5 to 20 weight percent based on the total weight of the paper. In an embodiment, the aramid fibrous pulp and the aramid floc and the aramid fibrids are p-aramid fibrous pulp and p-aramid floc and p-aramid fibrids.

Clause 9: The paper of any of the preceding clauses further comprising fillers or friction modifying particles.

Clause 10: The paper of clause 9 wherein the fillers or friction modifying particles are one or more of: silica, diatomaceous earth, graphite, alumina, metal oxides, metal nitrides, or metal carbides.

Clause 10a: The paper of clause 9 wherein the fillers are one or more of: silica, diatomaceous earth, graphite, or alumina.

Clause 10b: The paper of clause 9 wherein the friction modifying particles are one or more of: metal oxides, metal nitrides, or metal carbides.

Clause 11: The paper of clause 7 consisting of, or consisting essentially of, from 60 to 98 weight percent based on the total weight of the paper of aramid fibrous pulp, from 1 to 30 weight percent based on the total weight of the paper of aramid floc, and from 1 to 20 weight percent based on the total weight of the paper of polyvinylpyrrolidone. In an embodiment, the aramid fibrous pulp and the aramid floc are p-aramid fibrous pulp and p-aramid floc.

Clause 11a: The paper of clause 7 consisting of, or consisting essentially of, from 60 to 93 weight percent based on the total weight of the paper of aramid fibrous pulp, from 5 to 20 weight percent based on the total weight of the paper of aramid floc, and from 2 to 20 weight percent based on the total weight of the paper of polyvinylpyrrolidone. In an embodiment, the aramid fibrous pulp and the aramid floc are p-aramid fibrous pulp and p-aramid floc.

Clause 12: A composite comprising from 40 to 95 weight percent of the paper of clause 1 and from 5 to 60 weight percent of a resin wherein the resin is phenolic, silicone, polyimide or combinations thereof.

Clause 13: The composite of clause 12 comprising from 60 to 90 weight percent of the paper of clause 1 and from 10 to 40 weight percent of the resin.

Clause 14: A composite comprising from 40 to 95 weight percent of the paper of clause 7 and from 5 to 60 weight percent of a resin wherein the resin is phenolic, silicone, polyimide or combinations thereof.

Clause 15: The composite of clause 14 comprising from 60 to 90 weight percent of the paper of clause 7 and from 10 to 40 weight percent of the resin.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

Test Methods

The average thickness of the base and friction papers were measured according to ASTM D645M-97 (2007) using a Thwing-Albert ProGage instrument at 5 points of the paper sample.

The average thickness of the friction paper was measured by thickness gauge, model ID-C1128 Mitsutoyo Corporation, and the thickness of breaking point of the paper sample was used.

The areal weight of the base and friction papers was measured according to ASTM D646-13.

The areal weight of the friction paper was calculated by measured weight divided by area (21 cm×9 cm) right after the curing.

The porosity and air permeability of the base and friction papers was measured according to ASTM D726-94 using a Genuine Gurley 4320 Gurley Densometer 4110 (Gurley Precision Instruments, Troy, N.Y.). Individual samples were placed in the holder of the Densometer and air at a pressure of 0.304 (kPa) is forced through an area of 0.1 inch$^2$ or 0.645 cm$^2$ of the sample, recalculated by software to 1 inch$^2$ or 6.45 cm$^2$. The time in seconds required for 300 cc (cm$^3$) of air to pass through the sample was recorded as the Gurley air permeability with the units of (s/300 cm$^3$ or s/300 cc), referred to herein as the Gurley air permeability 300 cc value. Values are reported as an average of 5 tests of each sample. The machine also calculates the porosity. Qualitatively, porosity and permeability are related in that a higher porosity leads to a higher permeability, although it should be noted that the permeability is recorded here in terms of the time (in seconds) that it takes for 300 cc of air to pass through the sample. A shorter (smaller) time equates to a higher permeability; so the time in seconds is actually inversely related to the permeability.

The tensile strength values of both the base and friction papers were measured according to ASTM D828-16. Values are reported as an average of 8 tests of each sample.

EXAMPLES

The following examples are given to illustrate the invention and should not be interpreted as limiting it in any way. All parts and percentages are by weight unless otherwise indicated. Examples prepared according to the current invention are indicated by numerical values. Control or Comparative Examples are indicated by letters. Data and test results relating to the Comparative and Inventive Examples are shown in Tables 1 and 2.

The pulp used in all examples was p-aramid Kevlar® merge 1F892 at 2.25 denier per filament commercially available from E.I. DuPont de Nemours and Company, Wilmington, Del.

The floc was p-aramid Kevlar® merge 1F570 at 3 mm cut length also commercially available from E.I. DuPont.

The PVP was obtained from BASF, Florham, N.J. under the tradename Sokalan. The grade was K30P.

Preparation of Base Paper for Comparative Example A p-aramid pulp was added to water while stirring to provide a 2% slurry of p-aramid pulp. The slurry was filtered through a filter bag and the wet filter cake pressed at ambient temperature in a flat press at a pressure of 100 psi for 1 minutes to complete dewatering. The paper was not dried.

7.46 g of p-aramid pulp was added to 2.5 liters of water to form a second slurry which was then fed over a filter screen on a laboratory paper making machine. The formed paper was not further pressed but was dried for 5 minutes at 300+/−20° C.

The dried paper had an average thickness of 0.72 mm, an areal weight of 168 g/m$^2$ (gsm, grams per square meter) and a porosity of 83.8%. The paper was tested for air permeability and tensile strength with the results being shown in Table 1.

Preparation of Base Paper for Example 1

This was prepared in a similar way to Comparative Example A except that after the p-aramid pulp was added to make the slurry, an amount of PVP was also added, while stirring, in an amount such that the weight of PVP added was 5% of the weight of added p-aramid pulp. The pressures, times and temperatures were the same as for Comparative Example A.

The dried paper had an average thickness of 0.69 mm, an areal weight of 170 g/m$^2$ and a porosity of 82.9%. The paper was tested for air permeability and tensile strength with the results being shown in Table 1.

Preparation of Base Paper for Example 2

This was prepared in a similar way to Comparative Example A except that after the p-aramid pulp was added to make the slurry, an amount of p-aramid floc was added, while stirring, in an amount such that the weight of p-aramid floc added was 20% of the weight of added p-aramid pulp and an amount of PVP was also added, while stirring, in an amount such that the weight of PVP added was 5% of the weight of added p-aramid pulp. The pressures, times and temperatures were the same as for Comparative Example A.

The dried paper had an average thickness of 0.76 mm, an areal weight of 164 g/m$^2$ and a porosity of 85.1%. The paper was tested for air permeability and tensile strength with the results being shown in Table 1.

TABLE 1

| Example Ref. | Tensile Strength (MPa) | Gurley 300 cc Permeability (s) | Ratio of Tensile: Gurley (MPa/s) |
| --- | --- | --- | --- |
| Comp. Ex. A | 4.6 | 2.1 | 2.2 |
| Ex. 1 | 9.2 | 2.1 | 4.4 |
| Ex. 2 | 14.9 | 1.0 | 14.9 |

Preparation of Friction Papers

To test the efficacy of the base paper as a friction material, the base papers were dipped in a phenolic resin. The resin was type PR54562 in a methanol solvent (30% solution) from Sumitomo Bakelite, NA (Novi, Mich., USA). After dipping, the paper was removed and surplus resin allowed to drain away. The paper was air dried for 30 minutes and then dried in an oven at 100° C. for 15 minutes. The resin content of the paper was measured by percent concentration of mass. The paper was then placed between glass plates and the resin cured at 165° C. for 10 minutes followed by a post-cure in an oven at 165° C. for 5 hours. The resin content in the coated paper was determined by comparing the relative weights of the paper before and after resin coating.

Comparative Example B was made from the base paper of Comparative Example A. Examples 3-8 were made similarly to Comparative Example B except that during the making of the base paper, PVP was added as described for Example 1 in amounts shown as in Table 2.

Physical properties averaged over 7 samples were determined for each type of friction paper and are summarized in Table 2.

Tensile tests were carried out on 120×10 mm test samples of friction paper with a chuck distance of 60 mm. Thickness was measured at three points along the sample and the thickness nearest the break point used in the calculation. The tests were carried out at a speed of 1 mm per minute at ambient temperature (about 23° C.). The highest and lowest tensile values were eliminated and the average tensile strength determined from the remaining five samples (below, Table 2).

TABLE 2

| Test | Comp B | 3 | 4 | 5 | 6 | 7 | 8 |
|---|---|---|---|---|---|---|---|
| % PVP | None | 3 | 5 | 7 | 10 | 15 | 20 |
| Resin % | 30.1 | 29.0 | 28.4 | 29.5 | 29.5 | 28.9 | 29.8 |
| Thickness (mm) | 0.84 | 1.02 | 0.81 | 0.79 | 0.78 | 0.79 | 0.75 |
| Areal Weight (gsm) | 255.7 | 283.1 | 228.6 | 221.2 | 250.8 | 248.7 | 229.1 |
| Tensile (MPa) | 7.20 | 7.61 | 8.95 | 8.18 | 11.17 | 10.40 | 10.24 |
| Gurley 300 cc Permeability (s) | 2.3 | 3.1 | 2.5 | 2.5 | 2.6 | 3.3 | 2.9 |

Conventional knowledge is that as the porosity of a paper increases, the tensile strength decreases. For friction papers it is desirable to have an increased tensile strength without detriment to porosity. Unexpectedly and surprisingly, it was found that addition of PVP to the base paper pulp allowed for such an increase in friction paper tensile values while maintaining acceptable porosity levels. PVP additions of around 10% by weight seemed to give optimal tensile performance.

What is claimed is:

1. A paper comprising from 60 to 99 weight percent based on the total weight of the paper of an aramid fibrous pulp, said fibrous pulp comprising fibers, and from 1 to 40 weight percent based on the total weight of the paper of polyvinylpyrrolidone present as a coating on the surface of the fibers, the coating being neither chemically nor electrostatically bound to the fibers.

2. The paper of claim 1 comprising from 80 to 98 weight percent of aramid fibrous pulp and from 2 to 20 weight percent of polyvinylpyrrolidone.

3. The paper of claim 1 comprising from 80 to 95 weight percent of aramid fibrous pulp and from 5 to 20 weight percent of polyvinylpyrrolidone.

4. The paper of claim 1 comprising from 80 to 90 weight percent of aramid fibrous pulp and from 10 to 20 weight percent of polyvinylpyrrolidone.

5. The paper of claim 1 having a ratio of tensile strength to average Gurley air permeability 300 cc value of at least 4.0 MPa/s.

6. The paper of claim 1 consisting of, or consisting essentially of, from 60 to 99 weight percent of aramid fibrous pulp and from 1 to 40 weight percent of polyvinylpyrrolidone.

7. The paper of claim 1 further comprising aramid floc, said floc comprising fibers, which floc is present in an amount of from 1 to 30 weight percent based on the total weight of the paper, wherein the polyvinylpyrrolidone is present as a coating on the surface of the aramid fibrous pulp fibers and the aramid floc fibers, and wherein the aramid fibrous pulp is no more than 98 weight percent based on the total weight of the paper.

8. The paper of claim 1 further comprising a combination of aramid floc and aramid fibrids, said aramid floc and aramid fibrids comprising fibers, which combination of aramid floc and aramid fibrids is present in an amount of from 1 to 30 weight percent based on the total weight of the paper, wherein the polyvinylpyrrolidone is present as a coating on the surface of the aramid fibrous pulp fibers and the aramid floc fibers and the aramid fibrids, and wherein the aramid fibrous pulp is no more than 98 weight percent based on the total weight of the paper.

9. The paper of claim 1 or 7 further comprising fillers or friction modifying particles.

10. The paper of claim 9 wherein the fillers or friction modifying particles are one or more of: silica, diatomaceous earth, graphite, alumina, metal oxides, metal nitrides, or metal carbides.

11. The paper of claim 7 consisting of, or consisting essentially of, from 60 to 98 weight percent based on the total weight of the paper of aramid fibrous pulp, from 1 to 30 weight percent based on the total weight of the paper of aramid floc, and from 1 to 20 weight percent based on the total weight of the paper of polyvinylpyrrolidone.

12. A composite comprising from 40 to 95 weight percent of the paper of claim 1 and from 5 to 60 weight percent of a resin wherein the resin is phenolic, silicone, polyimide or combinations thereof.

13. A composite comprising from 60 to 90 weight percent of the paper of claim 1 and from 10 to 40 weight percent of a resin wherein the resin is phenolic, silicone, polyimide or combinations thereof.

14. A composite comprising from 40 to 95 weight percent of the paper of claim 7 and from 5 to 60 weight percent of a resin wherein the resin is phenolic, silicone, polyimide or combinations thereof.

15. A composite comprising from 60 to 90 weight percent of the paper of claim 7 and from 10 to 40 weight percent of a resin wherein the resin is phenolic, silicone, polyimide or combinations thereof.

* * * * *